US011936532B2

(12) United States Patent
Cokely et al.

(10) Patent No.: US 11,936,532 B2
(45) Date of Patent: Mar. 19, 2024

(54) DYNAMIC IoT DEVICE DEFINITION AND VISUALIZATION

(71) Applicant: Insight Direct USA, Inc., Tempe, AZ (US)

(72) Inventors: Dan Cokely, Boston, MA (US); Mark Candelora, Reading, MA (US); Nathan Parson, Mesa, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 17/589,235

(22) Filed: Jan. 31, 2022

(65) Prior Publication Data

US 2023/0246923 A1    Aug. 3, 2023

(51) Int. Cl.
*G06F 15/173*    (2006.01)
*H04L 41/084*    (2022.01)
*H04L 41/12*     (2022.01)
*H04L 41/14*     (2022.01)
*H04L 41/22*     (2022.01)

(52) U.S. Cl.
CPC .......... *H04L 41/22* (2013.01); *H04L 41/0843* (2013.01); *H04L 41/12* (2013.01); *H04L 41/14* (2013.01)

(58) Field of Classification Search
CPC ..... H04L 41/22; H04L 41/0843; H04L 41/12; H04L 41/14
See application file for complete search history.

(56) References Cited

U.S. PATENT DOCUMENTS

2008/0281472 A1* 11/2008 Podgorny .............. G05B 15/02
                                                        700/276
2019/0011894 A1*  1/2019 Meyer .................... G05B 15/02

* cited by examiner

*Primary Examiner* — Padma Mundur
(74) *Attorney, Agent, or Firm* — Kinney & Lange, P.A.

(57) ABSTRACT

Apparatus and associated methods relate to dynamically configuring a User Interface (UI) dashboard corresponding to an Internet of Things (IoT) device. The UI dashboard is dynamically configured so as to render data that is appropriate to its specific use or application in the UI dashboard. A processor dynamically configuring the UI dashboard receives a device-data definition of data that the IoT device can provide. The processor captures a specific one of a plurality of selectable use cases of the IoT device. The processor configures the UI dashboard based, at least in part, on the specific one of the plurality of selectable use cases captured. The processor receives a data stream provided by the IoT device via the internet, the data stream conforming to the device-data definition. The processor renders the data stream received in the UI dashboard configured. The processor then sends the UI dashboard with the data stream rendered therein to a display device for display.

23 Claims, 12 Drawing Sheets

DYNAMIC IoT DEVICE DEFINITION AND VISUALIZATION

CROSS-REFERENCE TO RELATED APPLICATION(S)

This application is related to the following provisional U.S. patent applications: i) U.S. patent application No. 63/153,614, entitled "Dynamic IoT Rule and Alert Templating Engine," by Dan Cokely; ii) U.S. patent application No. 63/153,619, entitled "IoT Device Reading Transformations," by Dan Cokely and Anes Hassane; and iii) U.S. patent application No. 63/153,622, entitled "IoT Use Case Template," by Dan Cokely and Ben Kotvis.

This application is also related to the following non-provisional U.S. patent applications filed concurrently herewith: i) U.S. patent application Ser. No. 17/589,247, entitled "Dynamic IoT Rule and Alert Templating Engine," by Dan Cokely; ii) U.S. patent application Ser. No. 17/589,257, entitled "IoT Device Reading Transformations," by Dan Cokely and Anes Hassane; and iii) U.S. patent application Ser. No. 17/589,270, entitled "IoT Deployment Configuration Template," by Dan Cokely and Ben Kotvis.

Each of the above cited and related U.S. provisional and non-provisional patent applications are hereby incorporated by reference in its entirety.

BACKGROUND

The Internet of Things (IoT) is a name for the technology that provides internet connectivity to sensors, controllable devices, and systems thereof (a.k.a. things). For systems having multiple components (e.g., sensors and controllable devices), intra-system communications amongst the components can be performed via the internet or via another communications channel configured for such a purpose for that system. Some IoT systems provide capability for a user to remotely view system data and/or to remotely control the system via the internet. Some systems can provide such control by way of a dashboard or user interface. Such a dashboard or user interface can be in the form of a webpage display, for example.

An IoT system can sometimes be used in different manners by different users. Such various manners of use can be called the IoT system's use case. For example, a temperature sensor could be used in a freezer for food safety or that same temperature sensor could be used to measure ambient room temperature. When used in a freezer for food safety monitoring, the user might want to know if the temperature of the freezer rises to above a critical temperature (e.g., a temperature no greater than the freezing point of water). When used as a room air temperature sensor, however, the user might want to know if the temperature remains in a comfort range (e.g., between 72° and 74° Fahrenheit or so).

IoT systems typically have user-selectable parameters to control such systems. For example, an IoT system might have user-selectable parameters that set or control: data sample rates; data filter behaviors; data units (e.g., ° F. or ° C., etc.); data computations (e.g., post processing of raw data, etc.); data communications (e.g., frequency of transmission, etc.), operational controls, alarm criteria, etc.

The specific use case of an IoT system might narrow the scope of the range of some of the user-selectable parameters that would likely best provide the information that is desired for such a use case. Therefore, user selection of a specific use case can be used by the dashboard to narrow a selectable range of the user-selectable parameters. But, even if so narrowed, the user-selectable parameters typically still permit some range of selection, within which different users might prefer different specific parameter values for various reasons. The specific use case can also affect what data should be displayed and how such data is displayed (e.g., in chart format, table format, graph format, as a single value, etc.).

Thus, the optimal dashboard configuration can be dramatically affected by the user-selectable parameters and use condition of each particular IoT system. Static dashboards can have complex visualizations but can also require significant manual setup or custom development. Furthermore, some IoT devices can be used as part of a larger IoT system of devices, as devices are added or removed from the system the dashboard should reflect such additions and/or removals. Thus, there is a need for dynamic dashboard creation that adapts to the use condition and the system parameters selected by the user.

SUMMARY

Apparatus and associated methods relate to dynamically generating a User Interface (UI) dashboard for interfacing with an Internet of Things (IoT) device. Some embodiments related to a method in which a device-data definition of data that the IoT device can provide to the processor is received by a processor. A specific one of a plurality of selectable use cases of the IoT device is captured by the processor. A User Interface (UI) dashboard is configured by the processor. Configuration of the UI dashboard is based, at least in part, on the specific one of the plurality of selectable use cases captured. A data stream conforming to the device-data definition is provided by the IoT device via the internet and received by the processor. The data stream received is rendered by the processor in the UI dashboard as configured. The UI dashboard with the data stream rendered therein is sent by the processor to a display device for display.

Some embodiments relate to a system dynamically generating a User Interface (UI) dashboard for interfacing with an Internet of Things (IoT) device. The system includes a processor and computer readable memory containing instructions that, when executed by the processor, cause the system to receive, by a processor, a device-data definition of data that the IoT device can provide to the processor. The computer readable memory contains further instructions that, when executed by the processor, cause the system to capture a specific one of a plurality of selectable use cases of the IoT device. Computer readable memory contains further instructions that, when executed by the processor, cause the system to configure a User Interface (UI) dashboard based, at least in part, on the specific one of the plurality of selectable use cases captured. The computer readable memory contains further instructions that, when executed by the processor, cause the system to receive a data stream provided by the IoT device via the internet, the data stream conforming to the device-data definition. The computer readable memory contains further instructions that, when executed by the processor, cause the system to render the data stream received in the UI dashboard as configured. The computer readable memory contains further instructions that, when executed by the processor, cause the system to send the data stream rendered therein to a display device for display.

DETAILED DESCRIPTION

This specification will describe various apparatus and methods directed toward streamlining deployments and operations of (Internet of Things) IoT devices and systems. Dynamic IoT device Definition and Visualization of a User Interface (UI) dashboard for providing a user interface with an IoT device will be discussed with reference to FIGS. 1-4. Dynamic IoT Rule and Alert Templating Engine will be discussed with reference to FIG. 5. IoT Device Reading Transformations will be discussed with reference to FIGS. 6-8. And IoT Deployment Configuration Templates will be discussed with reference to FIGS. 9-11.

Dynamic IoT Device Definition and Visualization

Apparatus and associated methods corresponding to Dynamic IoT Device Definition and Visualization relate to dynamically configuring a User Interface (UI) dashboard corresponding to an Internet of Things (IoT) device. The UI dashboard is dynamically configured so as to render data that is appropriate to its specific use or application. A processor dynamically configuring the UI dashboard receives a device-data definition of data that the IoT device can provide. In some embodiments, processor captures a specific one of a plurality of selectable use cases of the IoT device. The processor configures the UI dashboard based, at least in part, on the specific one of the plurality of selectable use cases captured. The processor receives a data stream provided by the IoT device via the internet, the data stream conforming to the device-data definition. The processor then renders the data stream received in the UI dashboard configured. Processor 16 then sends the UI dashboard with the data stream rendered therein to display device 18 for display. In some embodiments, processor 16 is a user's computer that is connected to the Internet. In other embodiments, some of the activities described as being performed by the processor are performed by cloud based processing. For example, a cloud based processor can determine the UI dashboard configuration and then send a signal indicative of that configuration to a user's computer.

Figure 1A:
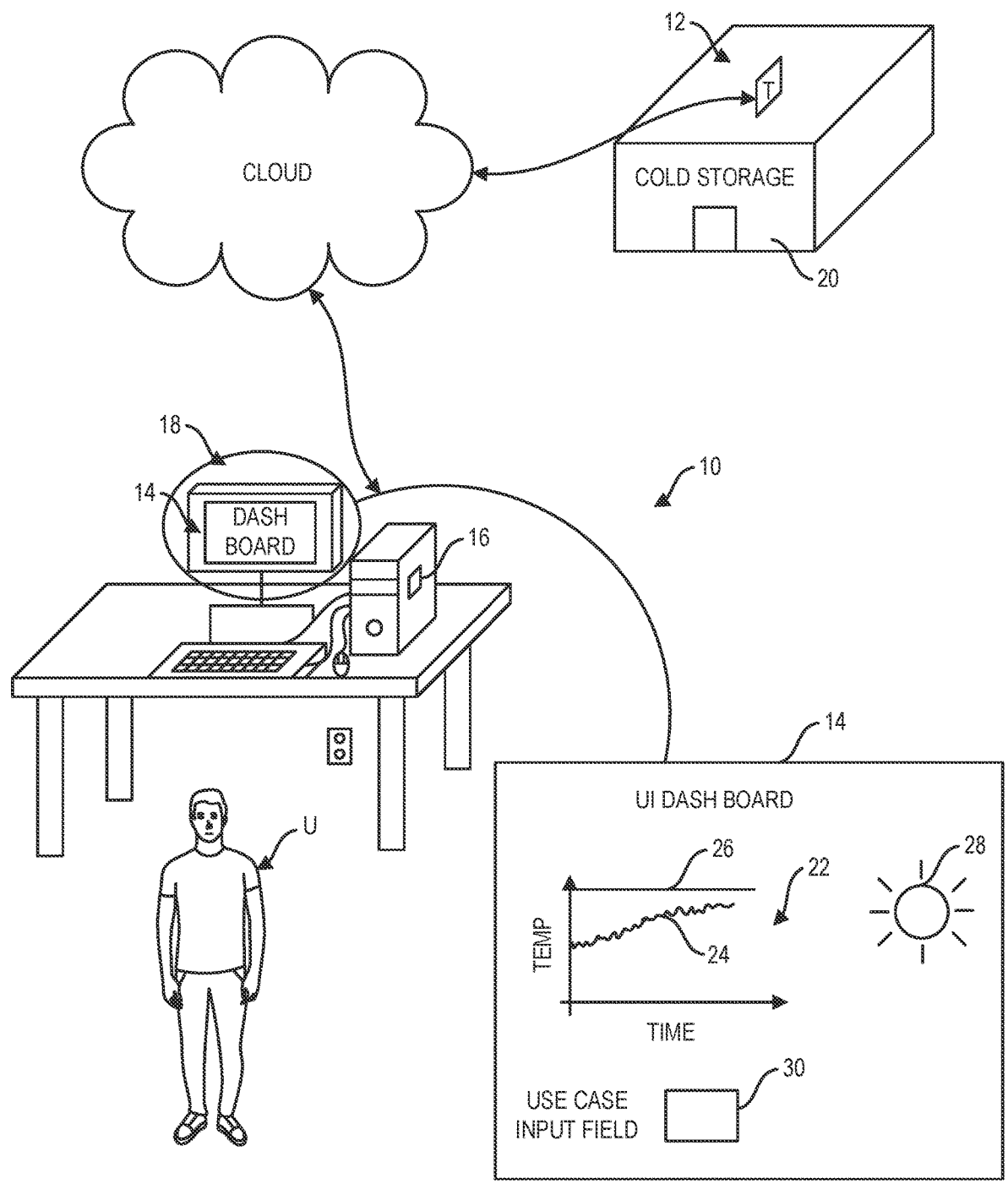
FIGS. 1A and 1B are schematic diagrams of an IoT system, in which a user interacts with an IoT device (or component) via a User Interface (UI) dashboard displayed on a computer's display device.
Figure 1B:
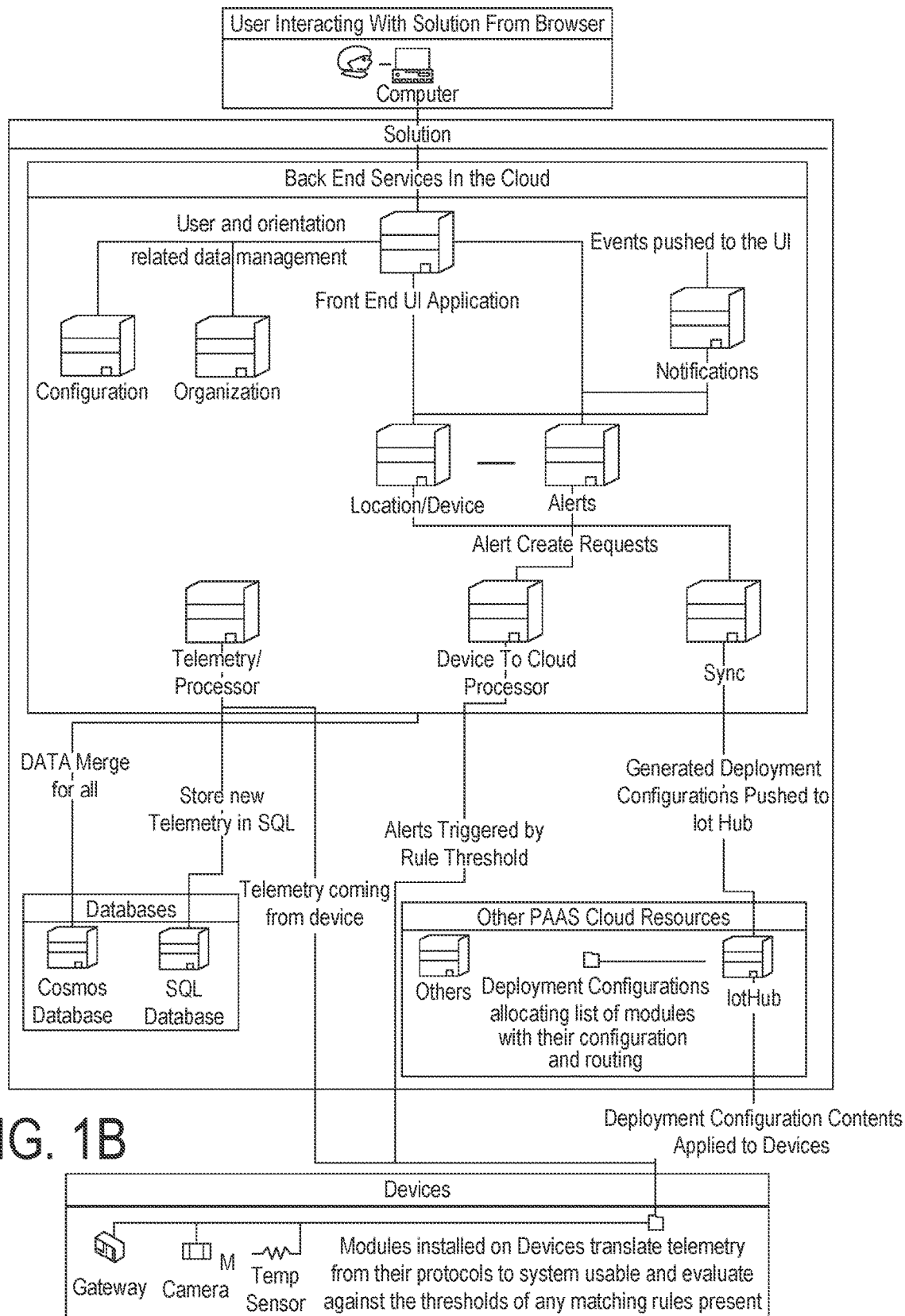

FIGS. 1A and 1B are schematic diagrams of IoT global network 10, in which user U interacts with IoT device (or component) 12 via User Interface (UI) dashboard 14 displayed on a computer's display device 18. In FIG. 1A, user U is interacting with IoT device 12 via UI dashboard 14 rendered by processor 16 on display device 18. In the FIG. 1A depiction, IoT device 12 is a temperature sensor installed in cold storage facility 20. UI dashboard 14 renders data provided by IoT device 12 in a manner dynamically configured to well communicate such data. The data is rendered in a manner appropriate to such a use case (i.e., cold storage temperature monitoring) so as to well serve the needs of user U of cold storage facility 20. In this specification, the term IoT device is interchangeable with IoT component to indicate a single IoT device 12, which may operate alone or in combination with other IoT devices 12 as part of an IoT system.

In the depicted embodiment, UI dashboard 14 displays various visual building blocks, each of which is for providing visualization of the data stream and/or for receiving user input(s). For providing user U with information suited for a use case of cold storage monitoring, UI dashboard 14 is configured to display temperature as graph 22 depicting temperature/time relation 24, along with temperature alarm condition 26. Such a display configuration provides immediate visual indication of the measured temperature/time relation 24 in relation to temperature alarm condition 26. For such a cold storage use case, should the measured temperature exceed temperature alarm condition 26, UI dashboard 14 could flash temperature alarm warning light 28, for example. Also depicted in UI dashboard 14 is use case input field 30, in which user U can input a specific one of a plurality of selectable use cases of IoT device 12 for capture by processor 16. In other embodiments, use case input field 30 is not depicted in UI dashboard 14. For example, when the use case is not solicited from the user, use case input field 30 will not be depicted.

Processor 16 can be programmed to dynamically configure UI dashboard 14. Dynamic configuration of UI dashboard 14 can be facilitated by various services provided in the cloud. Such cloud provided services can include: front-end UI services; back-end support services; database services; and other cloud-based resources. Processor 16 can be programmed to receive a device-data definition of data that IoT device 12 can provide to processor 16. For example, processor 16 can transmit via the internet a request to IoT device 12 for a device-data definition of data that IoT device 12 can provide to processor 16. Upon receiving the request for device-data definition, IoT device 12 transmits such device data definition to processor 16.

Processor 16 can further be programmed to capture a specific one of a plurality of selectable use cases of IoT device 12. In some embodiments, a plurality of such use cases can be defined by the program software that is being run by processor 16. In some other embodiments, the plurality of use cases can be included in the data-device definition transmitted by IoT device 12. A specific one of the plurality of use cases can be selected for capture in various manners. For example, in some embodiments, user U can select the specific use case via UI dashboard 14. In other embodiments, IoT device 12 is preconfigured for the specific use case, and IoT device 12 transmits the preconfigured specific use case as part of the device-data definition. In some other embodiments, the use case can be provided by the deployment configuration template, which can be used to configure IoT device 12 and UI dashboard 14 upon initial deployment of IoT device 12. In still other embodiments, the use case is not explicitly communicated, but can be determined based on parameters selected/established during initial deployment configuration (e.g., based on alarm condition, location, configuration, etc.). Various cloud-based services can facilitate determination of the use case. For example, the use case can be determined by various other parameters selected/established during configuration. Regardless of how the specific use case in selected, processor 16 captures such a specific use case so as to use this use case information in dynamically configuring UI dashboard 14. In embodiments in which the use case is not explicitly communicated, the use case is captured by the way the data provide by IoT device 12 is displayed in the UI dashboard.

Processor 16 then configures UI dashboard 14 based, at least in part, on the specific one of the plurality of selectable use cases captured. Each use case can have a UI dashboard configuration that is appropriate for that specific use case. The relation between use cases and configurations of UI dashboard 14 can be defined in the device-data definition, by a use case template, by the various services provided by the cloud, or by the program software that is being run by processor 16. Regardless of how the relation between the use cases and the configurations of UI dashboards are defined, processor 16 dynamically configures UI dashboard 14 in a manner appropriate for the specific use case captured or for a device-data definition.

Processor 16 is programmed to receive a data stream provided by IoT device 12 via the internet, the data stream conforming to the device-data definition. In some embodiments, the data stream does not change in response to the use case captured by processor 16. In such an embodiment, processor 16 will use data from the data stream that is appropriate for the UI dashboard dynamically configured for the use case captured. In some other embodiments, user U can configure, via UI dashboard 14, IoT device 12 to transmit certain data in the data stream. In such an embodiment, processor 16 can dynamically reconfigure UI dashboard 14 in response to the user's selection of data. In such embodiments, UI dashboard 14 can be dynamically configured based on both the use case captured and the user's selection of data to display. In some embodiments, processor 16 determines what data corresponds to the use case captured, and then sends a request for IoT device 12 to transmit a data stream that includes such data. Processor 16 then renders the data stream received in UI dashboard 14 configured for displaying such data in a manner appropriate for the use case captured. By dynamically configuring UI dashboard 14 based, at least in part, on the use case captured, appropriate presentation of data can be expeditiously deployed (e.g., without customization) for IoT devices that are capable of use in multiple different applications (i.e., use cases).

FIG. 1B depicts global network 10, especially the various cloud base resources, in greater detail than FIG. 1A. In FIG. 1A, global network 10 includes user U interacting IoT devices 12A-12C, via computer 11. Such interaction is conducted via internet 48 (i.e., cloud). Within the cloud, various computers or systems perform various services designed to facilitate user U interacting with IoT devices 12A-12C. The cloud-based services includes front-end UI application 31A, a variety of back-end services 31B-31I, databases 31J-31K, and other cloud resources 31L-31M. Back-end cloud-based services include: configuration services 31B, organization services 31C, notification services 31D, location/device services 31E, alert services 31F, telemetry services 31G, device-cloud interface 31H, and synchronization services 31I. Databases include a Cosmos database 31J and an SQL database 31K. Other cloud-based resources include IoTHub services 31L, as well as other services 31M.

Figure 2A:
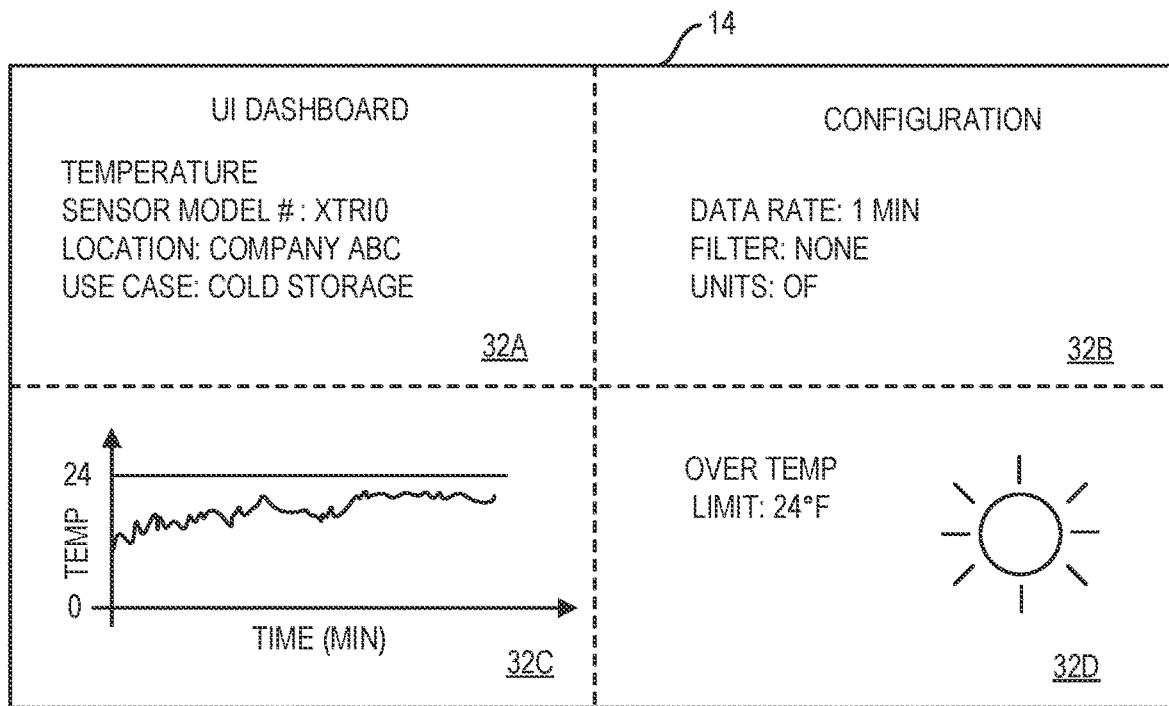
FIGS. 2A and 2B are examples of UI dashboards for two different use cases, in which the IoT device is an IoT temperature sensor.
Figure 2B:
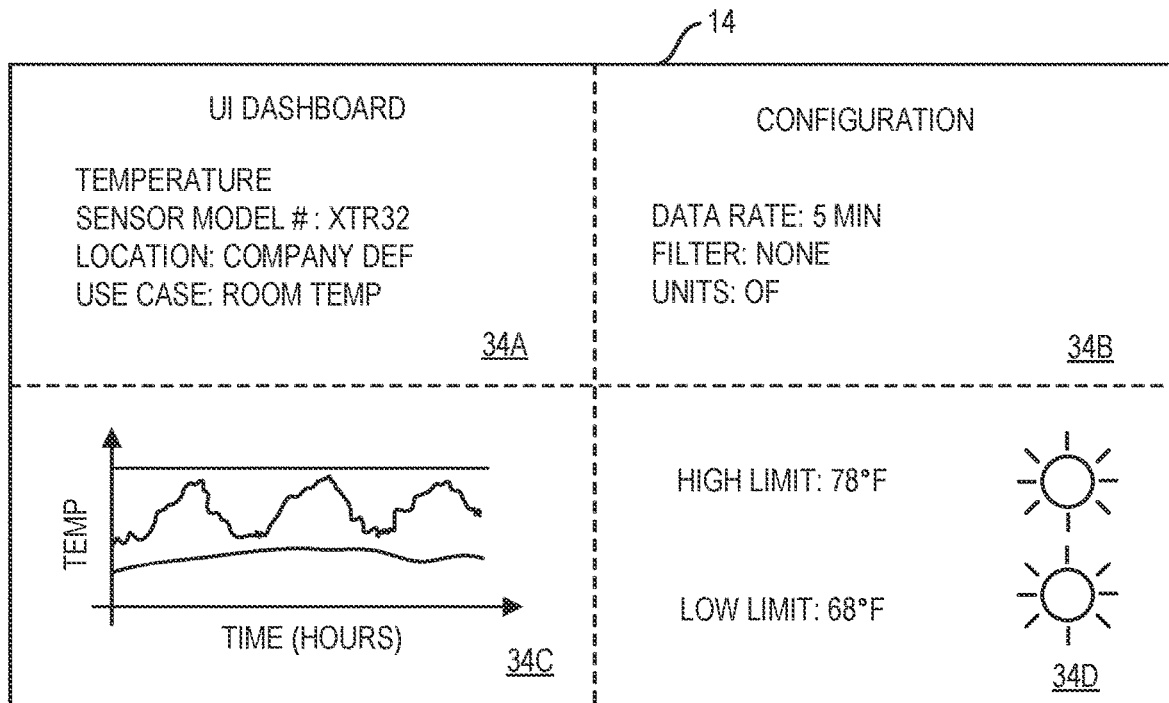

FIGS. 2A and 2B are examples of UI dashboards 14 for two different use cases, in which IoT device 12 is an IoT temperature sensor. In FIG. 2A, UI dashboard 14 has been dynamically configured using visual building blocks 32A-32D to display temperature data obtained by an IoT temperature sensor installed to monitor temperature in a cold storage facility. Visual building block 32A displays information regarding the specific IoT device, its location, and its use case. Visual building block 32A indicates that specific IoT device 12, with which UI dashboard 14 interfaces, is a temperature monitor with a specific use case for a cold storage facility. In some embodiments, user U can input a use case into the appropriate field depicted in visual building block 32A. In other embodiments, the use case is provided by specific IoT device 12, with which UI dashboard 14 interfaces. In either case, UI dashboard 15 is dynamically reconfigured to present the data provided by an IoT device 12 in a manner appropriate to the use case captured or the device-data definition.

Visual building block 32B includes various configuration metrics pertaining to IoT device 12, with which UI dashboard 14 interfaces. In some embodiments, user U can change these metrics by inputting new values for such metrics, via input fields of visual building block 32B. Upon inputting new metrics, processor 16 will transmit such metrics to IoT device 12, with which UI dashboard 14 interfaces. In other embodiments, the configuration metrics are simply received, by processor 16, as part of a device-data definition transmitted by IoT device 12, with which UI dashboard 14 interfaces. In some embodiments, UI dashboard 14 is dynamically reconfigured in response changes in these configuration metrics. For example, these configuration metrics can include various alarm conditions. Changes in the alarm conditions can cause changes in which data is presented in UI dashboard 14 and/or in how the data is presented.

Visual building block 32C is a graph of a temperature/time relation, as measured by IoT device 12, with which UI dashboard 14 interfaces. Also depicted in visual building block 32C is a temperature threshold that corresponds to an alert condition. Visual building block 32C depicts a data stream within a scale that is appropriate to a cold storage facility use case for IoT device 12, with which UI dashboard 14 interfaces. Such data scaling can be part of the dynamic configuring of UI dashboard 14, which in some embodiments can be based, at least in part, on the use case.

In response to the temperature/time relation exceeding the temperature threshold, an alert condition is determined. Visual building block 32D is devoted to alert conditions, such as when the temperature/time relation exceeds the temperature threshold. Visual building block 32D provides a visual (as well as perhaps an audible) alert to user U, as well as providing information regarding the alert condition. In the depicted embodiment, the information can include the actual temperature difference between the measured temperature and the temperature threshold, the length of time that the measured temperature has remained above the temperature threshold, etc. UI dashboard 14 is configured to provide information to user U in a manner that is appropriate to the use case of IoT device 12 or the device-data provided by IoT device 12, with which UI dashboard 14 interfaces.

In FIG. 2B, UI dashboard 14 has been dynamically configured to display temperature data obtained by IoT device 12, which is an IoT temperature sensor installed in a building's room, in which people can occupy. In this embodiment, UI dashboard 14 includes visual building blocks 34A-34D. Visual building block 34A displays information regarding the specific IoT device 12, its location, and, in some embodiments, its use case. Visual building block 34A indicates that specific IoT device 12, with which UI dashboard 14 interfaces, is a temperature monitor with a specific use case of an occupiable room. In some embodiments, user U can input a use case into the appropriate field depicted in visual building block 34A. In other embodiments, the use case is provided by specific IoT device 12, with which UI dashboard 14 interfaces. In either case, the UI dashboard is dynamically reconfigured to present the data provided by IoT device 12 in a manner appropriate to the use case captured.

Visual building block 34B includes various configuration metrics pertaining IoT device 12, with which UI dashboard 14 interfaces. In some embodiments, the user can change these metrics by inputting new values for such metrics, via input fields of visual building block 34B. Upon inputting new metrics, the processor will transmit such metrics to IoT device 12, with which UI dashboard 14 interfaces. In other embodiments, the configuration metrics are simply received, by a processor, as part of a device-data definition transmitted by IoT device 12, with which UI dashboard 14 interfaces. In some embodiments, the UI dashboard is dynamically reconfigured in response changes in these configuration metrics. For example, these configuration metrics can include various alarm conditions. Changes in the alarm conditions can cause changes in which data is presented in UI dashboard 14 and/or in how the data is presented.

Visual building block 34C is a graph of a temperature/time relation, as measured by IoT device 12, with which UI dashboard 14 interfaces. Also depicted in visual building block 34C are temperature thresholds that corresponds to high-temperature and low-temperature alert conditions. Visual building block 34C depicts a data stream within a scale that is appropriate to an occupiable room use case for IoT device 12, with which UI dashboard 14 interfaces. Such data scaling can be part of the dynamic configuring of UI dashboard 14 based, in part, on the use case.

In response to temperature/time relation exceeding the high-temperature threshold or going below the low-temperature threshold, an alert condition is determined. Visual building block 34D is devoted to alert conditions, such as when temperature/time relation no longer remains between the low-temperature and high-temperature thresholds. Visual building block 34D provides a visual (as well as perhaps an audible) alert to user U, as well as providing information regarding the alert condition. In the depicted embodiment, the information can include the actual temperate difference between the measure temperature above the high-temperature threshold or below the low-temperature threshold, the length of time that the measured temperature has remained above or below the temperature thresholds, etc. UI dashboard 14 is configured to provide information to user U in a manner that is appropriate to the use case of IoT device 12, with which UI dashboard 14 interfaces.

Figure 3:
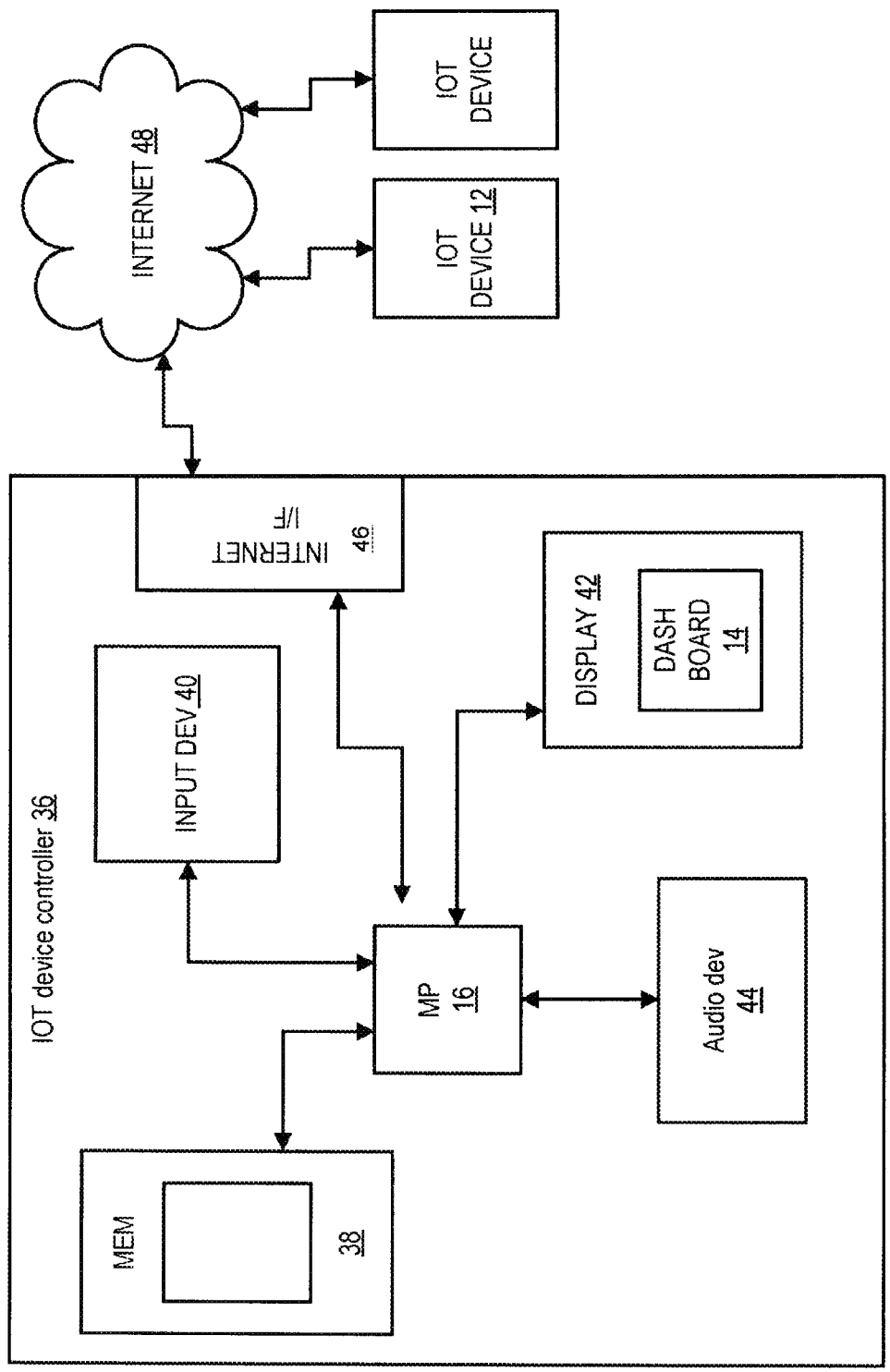
FIG. 3 is a block diagram of an exemplary system for dynamically configuring a UI dashboard corresponding to an IoT device.

FIG. 3 is a block diagram of an exemplary system for dynamically configuring UI dashboard 14 corresponding to IoT device 12. In FIG. 3, various elements of IoT device interface system 36 are shown as they pertain to dynamic configuration of UI dashboard 14 so as to provide user U with an interface to IoT device 12. IoT device interface system 36 includes processor 16, computer readable memory 38, user input device 40, display device 42, audio device 44, and internet interface 46. Processor 16 can be configured to perform operations pertaining to dynamic configuration of UI dashboard 14. Similarly, computer readable memory 38 can include program instructions $I_{OPERATION}$ pertaining to dynamic configuration of UI dashboard 14.

To perform functions pertaining to dynamic configuration of UI dashboard 14, processor 16 can read program instructions $I_{OPERATION}$ from computer readable memory 38, which cause processor 16 to: i) communicate with IoT device 12 via internet 48; and ii) communicate with user U via user input device 40, display device 42, and/or audio device 44. Such communication with IoT device 12 and user U is performed so as provide user U with an interface with IoT device 12. Dashboard 14 is used to provide a plurality of visual building blocks for use in providing information to user U and/or for soliciting inputs from user U.

UI dashboard 14 is dynamically configured, based, at least in part, on a use case captured of IoT device 12. Program instructions $I_{OPERATION}$ then may cause processor 16 to dynamically configure dashboard 14, in response to capturing the use case of IoT device 12. Examples of processor 16 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 38 can be configured to store information obtained and/or computed during operation of IoT device interface system 36. Computer-readable memory 38, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory 38 is a temporary memory, meaning that a primary purpose of computer-readable memory 38 is not long-term storage. Computer-readable memory 38, in some examples, is described as volatile memory, meaning that computer-readable memory 38 do not maintain stored contents when power to IoT device interface system 36 is turned off. Examples of volatile memories can include random-access memories (RAM), dynamic random-access memories (DRAM), static random-access memories (SRAM), and other forms of volatile memories. In some examples, computer-readable memory 38 is used to store program instructions for execution by processor 70. Computer-readable memory 38, in one example, is used by software or applications running on IoT device interface system 36 (e.g., a software program performing such dynamic configuration) to temporarily store information during program execution.

In some examples, computer-readable memory 38 can also include one or more computer-readable storage media. Computer-readable memory 38 can be configured to store larger amounts of information than volatile memory. Computer-readable memory 38 can further be configured for long-term storage of information. In some examples, computer-readable memory 38 includes non-volatile storage elements. Examples of such non-volatile storage elements can include magnetic hard discs, optical discs, flash memories, or forms of electrically programmable memories (EPROM) or electrically erasable and programmable (EEPROM) memories.

User input device 40 can include any such input device that a user can use to provide input to a processor. For example, user input device 40 can include a keyboard, mouse, trackpad, trackball, voice recognition module, etc. Display device 42 can be a computer screen, Virtual Reality (VR) goggles, a television screen, an optical projector, etc. Audio device 44 can be a speaker, headphones, a bell, an alarm, etc. Such user input and output devices are not limited to those expressly disclosed above as any such user interface device can provide the user/processor interface function for use by IoT device interface system 36.

Internet interface 46, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB).

Figure 4:
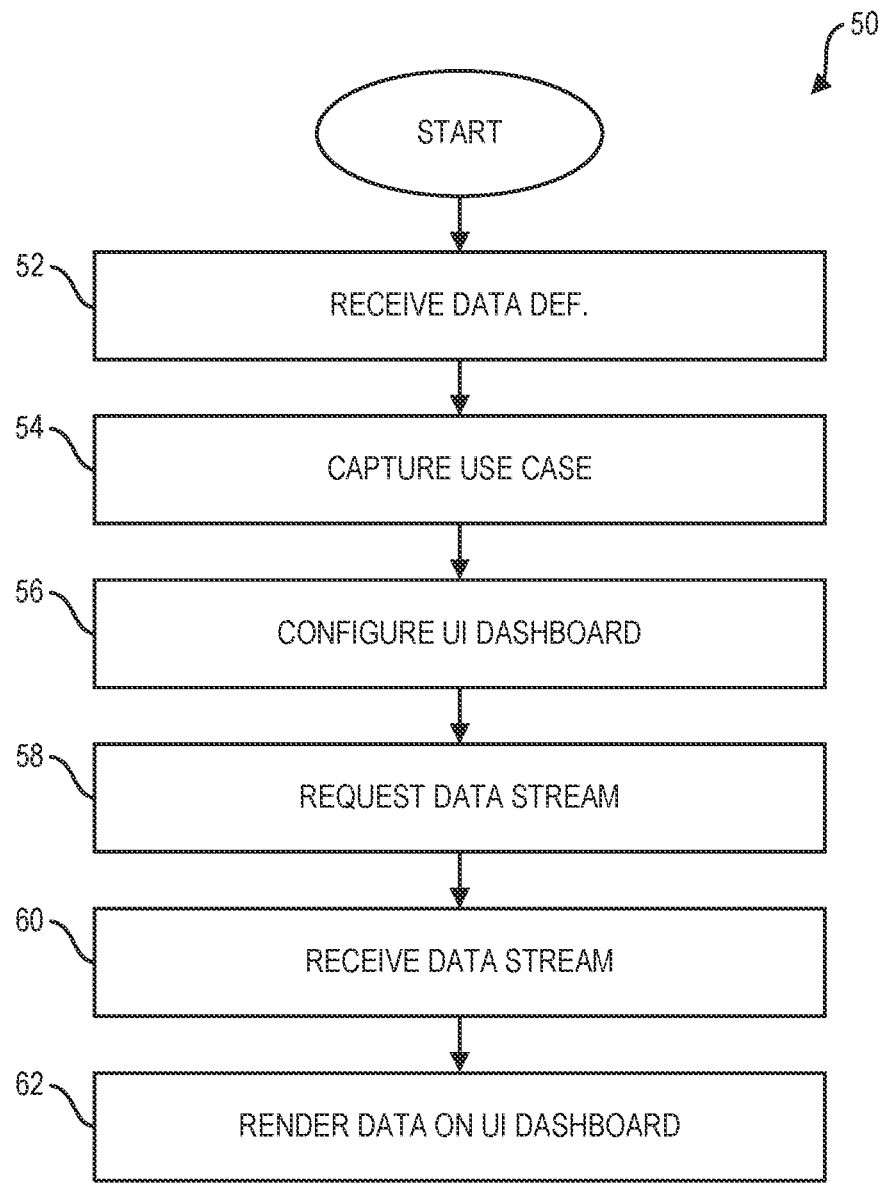
FIG. 4 is a flow chart of an exemplary method for dynamically configuring a UI dashboard corresponding to an IoT device.

FIG. 4 is a flow chart of an exemplary method for dynamically configuring a UI dashboard corresponding to an IoT device 12. In FIG. 4, method 50 can be performed, for example, by processor 16 of the above-described IoT device interface system 36 (as depicted in FIG. 3). Method 50 begins at step 52, where processor 16 receives a device-data definition of data that IoT device 12 can provide to processor 16. In some embodiments processor 16 receives the device-data definition in response to first requesting such a file to be transmitted by IoT device 12. The device-data definition defines data emitted by IoT device 12. Such a device-data definition can include, for example, data type(s), data sampling rate(s), data unit(s), data filter(s), and/or predefined data conversion(s). In some embodiments, such a device-data definition can define a default UI dashboard. In some embodiments, such a device-data definition can define data grouping information if the IoT device is used with other related IoT devices.

Method 50 continues at step 54, where processor 16 captures a specific one of a plurality of selectable use cases of IoT device 12. In some embodiments the specific one of the plurality of selectable use cases of IoT device 12 is captured by processor 16 receiving an input provided by user U via UI dashboard 14. In some other embodiments, the specific one of the plurality of selectable use cases is provided by IoT device 12 via the device-data definition or in some other manner. In some other embodiments, the use case can be provided by the deployment configuration template, which can be used to configure IoT device 12 and UI dashboard 14 upon initial deployment of IoT device 12. In still other embodiments, the use case is not explicitly communicated, but can be determined based on parameters selected/established during initial deployment configuration (e.g., based on alarm condition, location, configuration, etc.). Cloud-based services 31A-31M can facilitate determination of the use case. For example, the use case can be determined by various other parameters selected/established during configuration.

Method 50 continues at step 56, where processor 16 configures UI dashboard 14 based, at least in part, on the specific one of the plurality of selectable use cases captured. UI dashboard 14 can include a plurality of visual building blocks for visualization of the data stream and/or for receiving user input(s). For example, any of the plurality of visual building blocks of UI dashboard 14 can be configured to display, at least a portion of the data stream as a chart, as a graph, or as single value entries. Such single value entries can be a status icon and/or the latest data obtained by IoT device 12.

Method 50 continues at step 58, where processor 16 requests the data stream to be provided by IoT device 12, wherein the data stream requested is selected, based, at least in part, on the specific one of the plurality of selectable use cases captured. In some embodiments, for example, a data conversion can be requested to be performed by IoT device 12. Such a data conversion can covert the measured data into a new format that is appropriate to the use case of IoT device 12.

Method 50 continues at step 60, where processor 16 receives the data stream provided by IoT device 12 via internet 48. The data stream received by processor 16 is data that conforms to the device-data definition. The data stream received by processor 16 can be such data that was requested by processor 16 at step 58.

Method 50 continues at step 62, where processor 16 renders the data stream received in UI dashboard 14 as it was dynamically configured at step 56. This data is rendered in accord with the dynamically configured UI dashboard 14. Dynamic configuration of UI dashboard 14 can include selection of data to be rendered, method of rendering data, selection of input field into which user U can input configuration values, etc.

Dynamic IoT Rule and Alert Templating Engine

Apparatus and associated methods corresponding to Dynamic IoT Rule and Alert Templating Engine relate to dynamically generating a rule for determining an alert condition for Internet of Things (IoT) device 12. The rule is dynamically generated so as to generate an alert condition that is appropriate to a specific use or application of the IoT device. Processor 16 receives a device-data definition of data that IoT device 12 can provide to processor 16. Processor 16 captures a specific one of a plurality of selectable use cases of IoT device 12. Processor 16 and/or one or more cloud-based resources 31A-31M (e.g., alert services 31F) generates a rule for determining an alert condition, which, in some embodiments, can be based, at least in part, on the specific one of the plurality of selectable use cases captured. In other embodiments, the rule for determining an alert condition can be generated based on alert parameters established during initial deployment of IoT device 12. Such alert parameters can be provided in the deployment configuration template, for example, or by cloud-based services, or by some combination thereof. Processor 16 and/or one or more cloud-based resources 31A-31M receives a data stream provided by IoT device 12 via the internet. Processor 16 applies the rule generated to the data stream. Processor 16 and/or one or more cloud-based resources 31A-31M determines the alert condition based on the rule applied to the data stream. Then, processor 16 and/or one or more cloud-based resources 31A-31M generates an alert signal in response to the rule applied to the data stream satisfying the alert condition determined. The alert signal is configured to cause an alert to be generated by an alerting device. Because the rule for determining an alert condition can be generated by processor 16 and/or one or more cloud-based resources 31A-31M, the term processor 16 is used to refer to any such combination of devices so used.

According to techniques of this disclosure, a dynamic IoT rule and alert templating engine combines rule and alert templates with device-specific metadata corresponding to individual IoT devices 12 to automatically generate custom alerts for the IoT devices. The automated generation of custom alerts helps to decrease the time required for a technician or other user to configure a system of IoT devices 12 for deployment, thereby decreasing the deployment cost and increasing the feasibility of integrating hundreds or even thousands of individual IoT devices 12 in a particular implementation.

Many IoT devices 12 implement alerts that are common to many types of IoT devices 12, such as indications of communication status (e.g., online, or offline), battery level, failure mode, or other types of alerts that may be common to multiple types of IoT devices 12. Many IoT devices 12, however, are usable for multiple implementations, and are therefore often configured based on a use-case specific implementation. For instance, it is not uncommon that a specific temperature sensor can be utilized for the sensing of temperatures in various temperature ranges, the range of temperatures experienced by the sensor being dependent upon the environment in which the temperature sensor is utilized (e.g., a refrigerated environment vs. an environment that is typically room temperature). Accordingly, ranges at which a temperature sensor triggers an alert are often configured based on the environment in which the temperature is to be deployed. Similarly, many other sensor, actuator, or other IoT device types can include implementation-specific alerts that are configured at the time of commissioning or deployment of the system.

When onboarding IoT devices 12 at scale (e.g., hundreds or thousands of devices), it can become ineffective or otherwise impractical to manually define the alerts and individually configure IoT devices 12. As such, a dynamic IoT rule and alert templating engine implementing techniques described herein utilizes metadata associated with IoT devices 12 along with rule templates to automatically define custom rules and alerts for the individual IoT devices 12, thereby decreasing the need for manual configuration and deployment of the alerts.

Metadata definitions associated with IoT device 12 can define the telemetry (e.g., sensor data), deployment location, and other device-specific use case configuration data associated with the IoT device. The metadata definition is utilized in association with a rule template that determines a base set of properties for a rule and corresponding alert. As an example, a rule template can define an alert to be transmitted to a system administrator when a sensor value exceeds a threshold criterion, such as a threshold temperature, threshold pressure, or other criterion. Such a rule template (e.g., defining an alert based on a threshold criterion), can be utilized for multiple types of sensors in various environments. For instance, such a rule template combined with a metadata definition of a temperature sensor being used for cold chain application (i.e., an uninterrupted series of refrigerated production, storage, and distribution activities) can produce a rule that sets the threshold criterion to a temperature relevant for cold chain applications, and the recipient of the alert can be set to a location-specific system administrator based on the device definition metadata defining a deployment location of the device. The same rule template, however, can be applied to a temperature sensor being used for a retail store use case. In such an example, the threshold temperature criterion and recipient can be defined differently, such by setting a temperature threshold that is a higher temperature that is relevant for a non-refrigerated retail setting (e.g., room temperature).

Accordingly, the rule and alert templating engine can define custom rules and alerts for individual IoT devices 12 based on a first input corresponding to a device metadata definition (including, e.g., definitions for the device telemetry and use case metadata for which the device is being deployed) and a second input corresponding to a rule template that includes, e.g., constant values that apply to all rules based on the specific template and variable values that can be dynamically determined by the templating engine for the rule based on the device-specific metadata. In some examples, the rule template can include subsequent alerts to be generated when a rule is triggered in the system.

Accordingly, a dynamic rule and alert templating engine as described herein dynamically generates custom rules and corresponding alerts for IoT devices based on device-specific metadata and rule templates. The templating engine increases the feasibility of integration of multiple (e.g., hundreds or even thousands) of IoT devices within a single implementation, while enabling more complex alerts to be dynamically leveraged via the metadata definitions in combination with the alert templates. The rule and alert templating engine enables custom code logic to be executed to populate the configuration of the rules and alerts, instead of a substitution, thereby enabling rules and alerts to dynamically adjust as parts of the system change, such as users, location information, or other configuration parameters, without needing to change the alerts and templates. As such, techniques of this disclosure increase flexibility of deployment of IoT solutions while decreasing the associated configuration and deployment cost.

Figure 5:
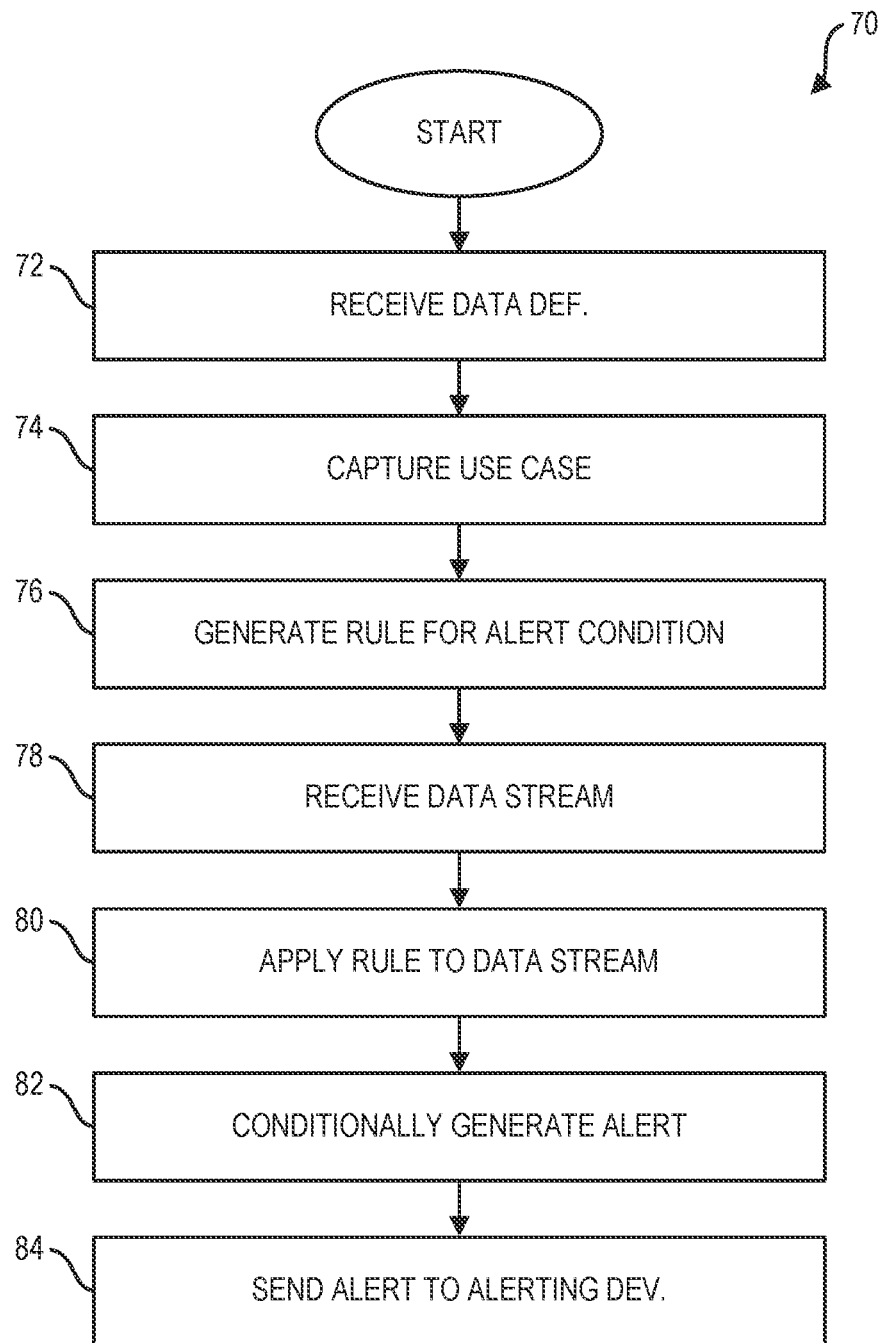
FIG. 5 is a flow chart of an exemplary method for dynamically generating a rule for determining an alert condition corresponding to a data stream provided by an IoT device.

FIG. 5 is a flow chart of an exemplary method for dynamically generating a rule for determining an alert condition corresponding to a data stream provided by an IoT device 12. In FIG. 5, method 70 can be performed, at least in part, by processor 16 of the above-described IoT device interface system 36.

Method 70 begins at step 72, where processor 16 receives a device-data definition of data that IoT device 12 can provide to processor 16. In some embodiments, processor 16 receives the device-data definition in response to first requesting such a file to be transmitted by IoT device 12. The device-data definition defines data emitted by IoT device 12. Such a device-data definition can include, for example, data type(s), data sampling rate(s), data unit(s), data filter(s), and/or predefined data conversion(s). In some embodiments, such a device-data definition can define a default UI dashboard. In some embodiments, such a device-data definition can define data grouping information if IoT device 12 is used with other related IoT devices.

At step 74, processor 16 captures a specific one of a plurality of selectable use cases of IoT device 12. In some embodiments the specific one of the plurality of selectable use cases of IoT device 12 is captured by processor 16 receiving an input provided by user via UI dashboard 14. In other embodiments, the specific one of the plurality of selectable use cases is provided by IoT device 12 via the device-data definition or in some other manner.

At step 76, processor 16 generates a rule for determining an alert condition based, at least in part, on the specific one of the plurality of selectable use cases captured. In some embodiments, processor 16 generates the rule by applying a rule template to the specific one of the plurality of selectable use cases captured and device-data definition of IoT device 12. Different rules can be generated for identical IoT devices 12 having different use cases. In some embodiments, the rule generated defines a threshold criterion, and the alert is generated in response to a comparison of a data stream of IoT device 12 to the threshold criterion. In some embodiments, the rule for determining the alert condition can be further based on the device-data definition.

At step 76, processor 16 renders a visual indication of the rule generated on a user Interface (UI) dashboard 14. UI dashboard 14 can be dynamically configured so as to render the rule generated in an appropriate manner. For example, processor 16 can select a visual building block corresponding to the rule generated from the rules template, and then dynamically configure UI dashboard 14 using the selected visual building block.

At step 78, processor 16 receives the data stream provided by IoT device 12 via internet 48. At step 80, processor 16 applies the rule determined to the data stream. At step 82, processor 16 generates an alert in response to the rule applied to the data stream satisfying the alert criterion. In some embodiments, processor 16 renders the alert on UI dashboard 14. In some embodiments, processor 16 generates an audible alert.

At step 84, processor 16 receives a location of IoT device 12. In some embodiments, this location can be received as part of the data-device definition. In other embodiments, this location can be input by a user via the UI dashboard. At step 84, processor 16 determines an alerting device based on the location of IoT device 12 and sends the alert to the alerting device determined.

IoT Device Reading Transformations

Apparatus and associated methods corresponding to IoT Device Reading Transformations relate to transformations of data provided by Internet of Things (IoT) device 12. Processor 16 and/or one or more cloud-based resources 31A-31M (e.g., telemetry services 31G) defines a data transformation corresponding to data transmitted by IoT device 12 in IoT global network 10. Again, the term "processor 16" is used in reference to processor 16 and/or any of the one or more cloud-base resources 31A-31M used to perform such a data transformation. The data transformation includes a definition of a transformation of data from a first format to a second format and an identification (ID) of IoT device 12. Processor 16 (e.g., telemetry services 31G) then compiles the data transformation to produce compiled executable code for performing the data transformation. Processor 16 registers the compiled executable code for the data transformation as an available transformation for various components of IoT global network 10. Processor 16 facilitates execution of the compiled executable code so as to perform the data transformation upon a data stream provided by IoT device 12.

A data transformation is defined corresponding to data transmitted by an Internet of Things (IoT) device in IoT global network 10. The data transformation includes a definition of a transformation of data from a first format to a second format and an identification of the IoT device. The data transformation is compiled to produce compiled executable code for the data transformation. The compiled executable code for the data transformation is registered as an available transformation for IoT global network 10. The compiled executable code for the data transformation is executed in response to receiving data from IoT device 12, According to techniques of this disclosure, data transformations are defined for use with received data, such as from Internet of Things (IoT) devices 12. The transformations are defined in a freeform manner and are compiled and dynamically registered in implemented IoT global network 10 without required redeployment of the system code base. A registered transformation can then be applied to existing definitions.

A definition of a data transformation can include a metadata description of the transformation and a definition to be compiled. The definition of the transformation can be loaded into implemented IoT global network 10 and compiled and registered as an available data transformation for use by system components.

As an example, a battery life data transformation definition can include, in source code format, a unique identifier of the battery (e.g., a battery ID), a data type (e.g., volts), a definition of the data transformation to be applied (e.g., a scale of volts to remaining battery life), and/or other information relevant to the data transformation. The transformation is provided to a compiler, which compiles the source code and registers the complied source code as an available transformation. The transformation can then be utilized by any module in IoT global network 10 without requiring that the entire system code base be recompiled and redeployed.

Accordingly, techniques of this disclosure enable data transformations to be dynamically compiled, registered, and made available to IoT global network 10 without requiring recompile and redeployment of the code base, thereby enabling the transformation to be utilized at all levels of IoT global network 10 and easily imported for a particular data type.

Figure 6:
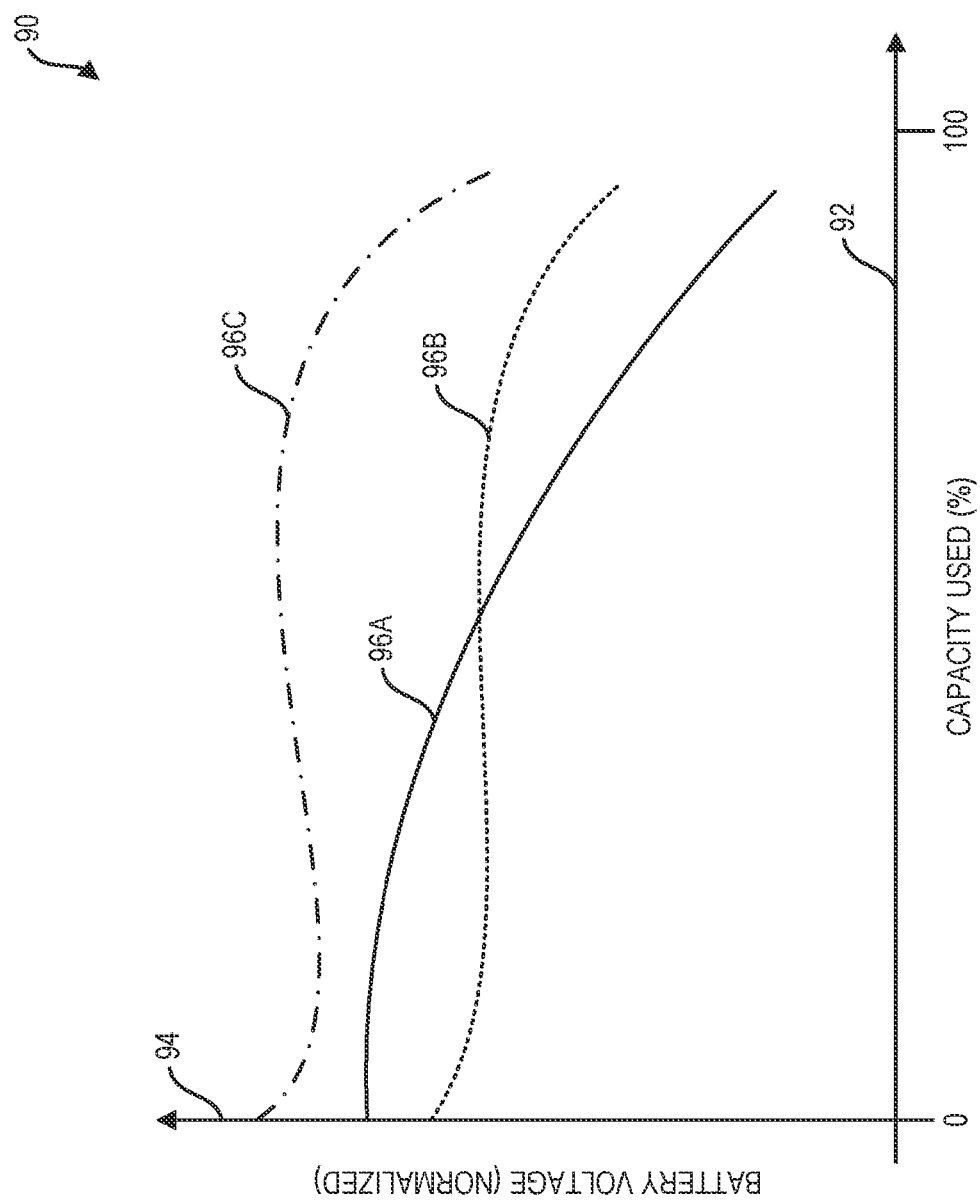
FIG. 6 is a diagram of graph of battery-voltage/remaining life relations pertaining to various types of batteries.

FIG. 6 is a diagram of graph of battery discharge relations pertaining to various types of batteries. In FIG. 6, graph 90 includes horizontal axis 92, vertical axis 94, and discharge relations 96A-96C. Horizontal axis 92 is indicative of total or integrated discharge of a battery in units of percentage of total battery discharge capacity. Vertical axis 94 is indicative of voltage (in volts normalized for comparison purposes) of the battery output. Discharge relations 96A-96C depict the voltage output by the batteries as a function of discharge. Each of discharge relations 96A-96C show that the battery has a monotonically decreasing voltage as the battery discharges. Discharge relation 96A is indicative of a lead acid battery. Discharge relation 96B is indicative of Lithium Iron Phosphate $LiFePO_4$ battery. Discharge relation 96C is indicative of Lithium Manganese Oxide $LiMnO_2$ battery. The axes of graph 90 can be interchanged so as to show battery discharge as a function of voltage, and the battery discharge percentage can be replaced with remaining life percentage for the new y-axis.

Figure 7:
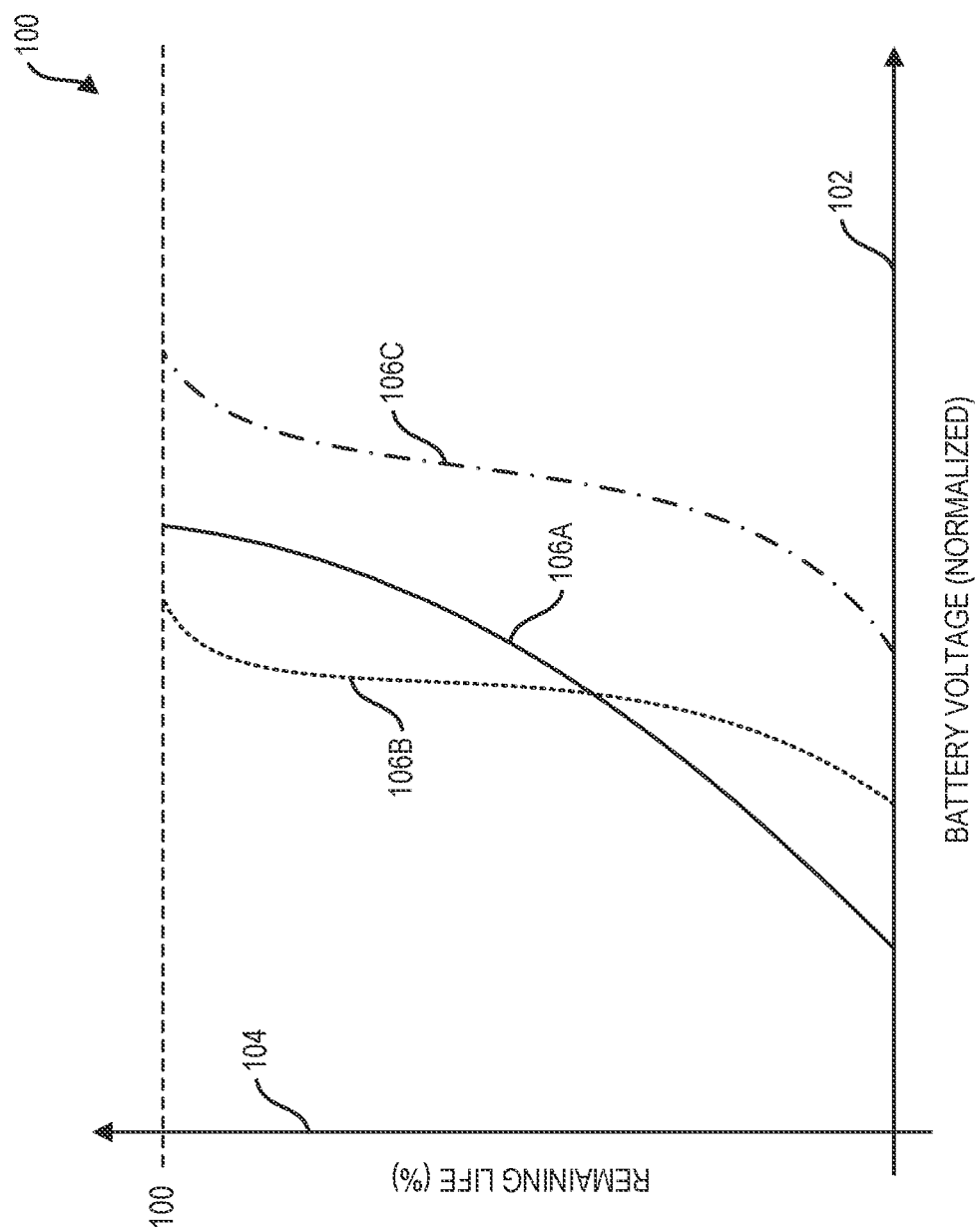
FIG. 7 depicts such a reconfigured graph of remaining battery lives of the battery types indicated in FIG. 6.

FIG. 7 depicts such a reconfigured graph of remaining battery lives of the battery types indicated in FIG. 6. In FIG. 7, graph 100 includes horizontal axis 102, vertical axis 104, and battery-life relations 106A-106C. Horizontal axis 102 is indicative of voltage (in volts) of the battery output. Vertical axis 104 is indicative of total or integrated remaining battery life total battery discharge capacity. Remaining battery-life relations 106A-106C depict the percentage of battery life remaining as a function of voltage output by the battery. Remaining battery-life relations 106A-106C correspond to battery discharge relations 96A-96C depicted in FIG. 6, respectively. Voltage data can be transformed to remaining battery life using such data as depicted in graph 100, for example.

Figure 8:
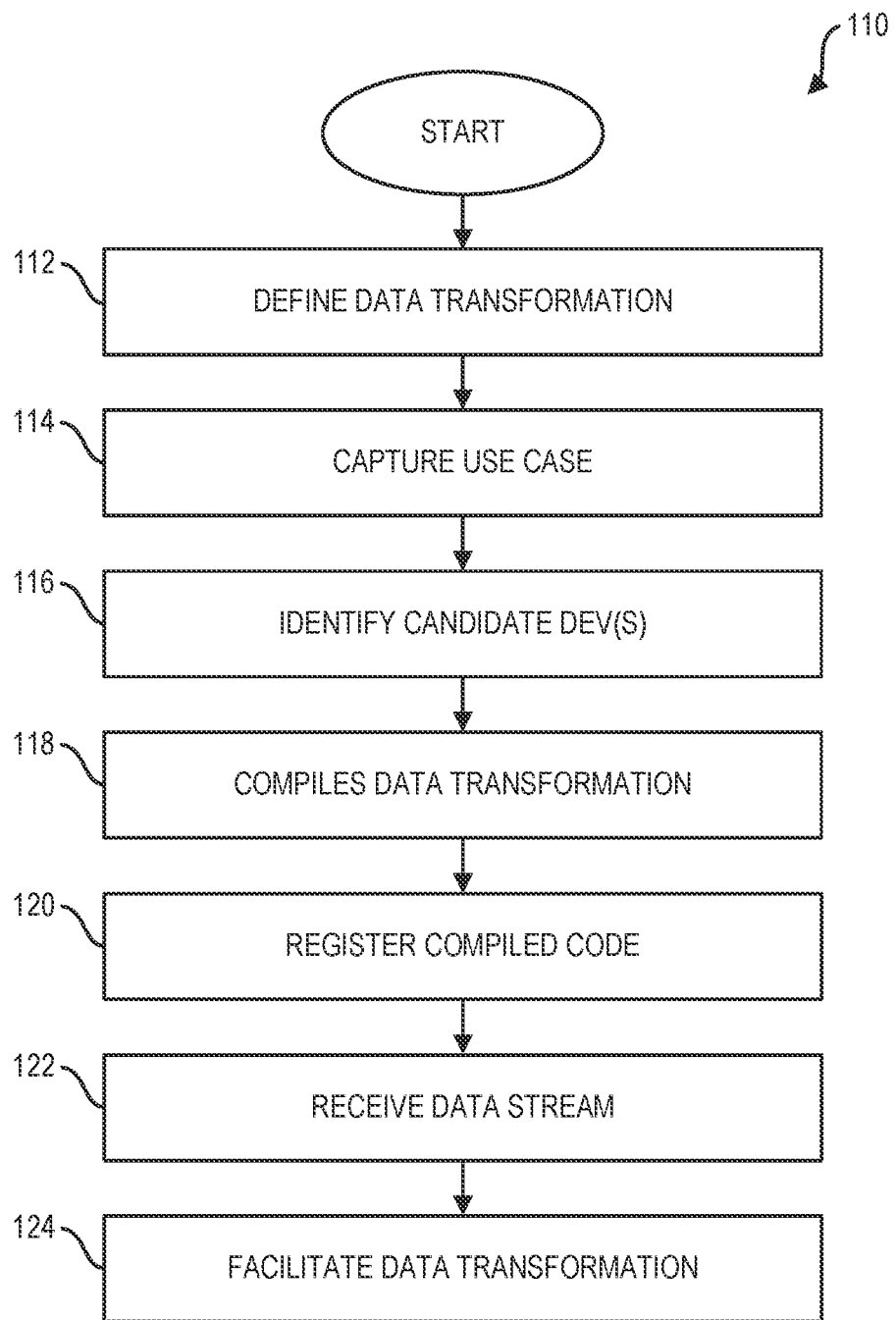
FIG. 8 is a flow chart of a method for performing a data transformation for use by various components of an IoT system.

FIG. 8 is a flow chart of a method for performing a data transformation for use by various components of IoT global network 10. In FIG. 8, method 110 can be performed, at least in part, by processor 16 of the above-described IoT device interface system 36.

Method 110 begins at step 112, where processor 16 defines a data transformation corresponding to data transmitted by an Internet of Things (IoT) device in IoT global network 10, such as, for example, battery-voltage output to remaining battery life. In some embodiments, processor 16 receives the device-data definition in response to first requesting such a file to be transmitted by IoT device 12. The device-data definition defines data emitted by IoT device 12. This data, defined by the device-data definition, can be the original data which will be transformed by processor 16. In some embodiments, IoT device 12 is identified as a candidate for performing the data transformation if IoT device 12 provides a particular type of data, as defined by the device-data definition. Such a device-data definition can include, for example, data type(s), data sampling rate(s), data unit(s), data filter(s), and/or predefined data conversion(s). In some embodiments, such a device-data definition can define a default UI dashboard. In some embodiments, such a device-data definition can define data grouping information if IoT device 12 is used with other related IoT devices.

At step 114, processor 16 captures a specific one of a plurality of selectable use cases of the IoT device. In some embodiments the specific one of the plurality of selectable use cases of IoT device 12 is captured by processor 16 receiving an input provided by user via UI dashboard 14. In other embodiments, the specific one of the plurality of selectable use cases is provided by IoT device 12 via the device-data definition or in some other manner.

At step 116, processor 16 identifies IoT device 12 as being a candidate for performing the data transformation based on the specific one of a plurality of selectable use cases of the IoT device. In some embodiments, IoT device 12 is identified as a candidate for performing the data transformation if the specific one of a plurality of selectable use cases of IoT device 12 matches a predetermined criterion. In some embodiments, IoT device 12 is identified as a candidate for performing the data transformation if IoT device 12 has a particular component, such as a specific type of a battery.

At step 118, processor 16 compiles the data transformation to produce compiled executable code for performing the data transformation. In some embodiments, the data transformation is compiled to be executable on IoT device 12 that generates the original data to be transformed. In other embodiments, the data transformation is compiled to be executable by the processor that will receive the original data to be transformed. In some embodiments, transmitting the compiled executable code to IoT device 12 is conditional based on the specific one of a plurality of selectable use cases of IoT device 12 matching the predetermined criterion.

At step 120, processor 16 registers the compiled executable code for the data transformation as an available transformation for various components of IoT global network 10. In some embodiments, such registering of the compiled executable code facilitates making such compiled executable code available to other components of IoT global network 10, especially those that have access to the registry, in which the compiled executable code is registered.

At step 122, processor 16 receives a data stream provided by IoT device 12 via the internet. In embodiments in which the data transformation is executed by IoT device 12 providing the data stream, the data stream can include the transformed data. In embodiments in which the data transformation is executed by processor 16, the data stream provides the original data to be transformed by processor 16.

At step 124, processor 16 facilitates execution of the compiled executable code so as to perform the data transformation upon a data stream provided by IoT device 12. In some embodiments, facilitating execution of the compiled executable code can include transmitting the compiled executable code to IoT device 12 so that IoT device 12 can execute the compiled executable code so as to perform the data transformation. In other embodiments, the compiled executable code is executed by processor 16 that compiled the data transformation.

IoT Deployment Configuration Template

Apparatus and associated methods corresponding to IoT Deployment Configuration Template relate to dynamically configuring Internet of Things (IoT) device 12 and processor 16 interfacing IoT device 12. IoT device 12 is configured to operate in accord with its specific use or application. IoT device 12 is then configured by processor 16 and/or one or more cloud-based resources 31A-31M (e.g., configuration services 31B) based, at least in part, on the specific one or more of the plurality of a plurality of deployment configuration templates captured. Again, the term "processor 16" is used in reference to processor 16 and/or any of the one or more cloud-base resources 31A-31M used to perform such a data transformation Processor 16 (e.g., configuration services 31B) then deploys software for use by processor 16 to interface with IoT device 12. The software deployed is determined based on the one or more of the plurality of deployment configuration templates captured.

According to techniques of this disclosure, a deployment configuration template defines configuration parameters and software module identifiers corresponding to IoT device 12. The deployment configuration template therefore enables tactical description of which software modules are to be deployed as well as minimum requirements for deploying IoT device 23.

Onboarding of IoT device 12 to an IoT platform typically involves configuration to setup IoT device 12. As described herein, a deployment configuration template is utilized for configuration and deployment of IoT devices 12 within IoT global network 10. The deployment configuration template includes a configuration of IoT device 12 and an identification of software modules required to process data on IoT device 12 (e.g., at the edge of IoT global network 10). In general, IoT devices 12 can utilize various software processing modules on the edge that are implemented in combination to solve a problem for a particular IoT implementation. The deployment configuration template described herein identifies configuration parameters for IoT device 12. In addition, the deployment configuration template identifies for the edge gateway device which software modules are to be deployed on the edge device for processing data by IoT device 12. The deployment configuration template can take the form of, e.g., a json descriptor or other type of template description that includes parameter definitions and values that are required for implementation of IoT device 12, as well as the software modules needed on the gateway.

As an example, IoT device 12 can be a thermal imaging camera. The thermal imaging camera can be utilized, e.g., for a first use case in which the image data is analyzed to identify a temperature of a person (or people), and for a second use case in which the image data is analyzed to determine a density of people in an area. The deployment configuration template, in such an example, can identify configuration parameters of the thermal imaging camera as well as the software modules to be used the edge gateway for processing data from the thermal imaging camera.

Accordingly, the deployment configuration template can help to tactically describe what software modules are deployed at which edge devices in IoT global network 10, as well as the minimum requirements to run IoT device 12. As described above, various aspects of operation of IoT device 12 can be dynamically controlled or tailored based on the specific deployment configuration selected for IoT device 12.

Figure 9:
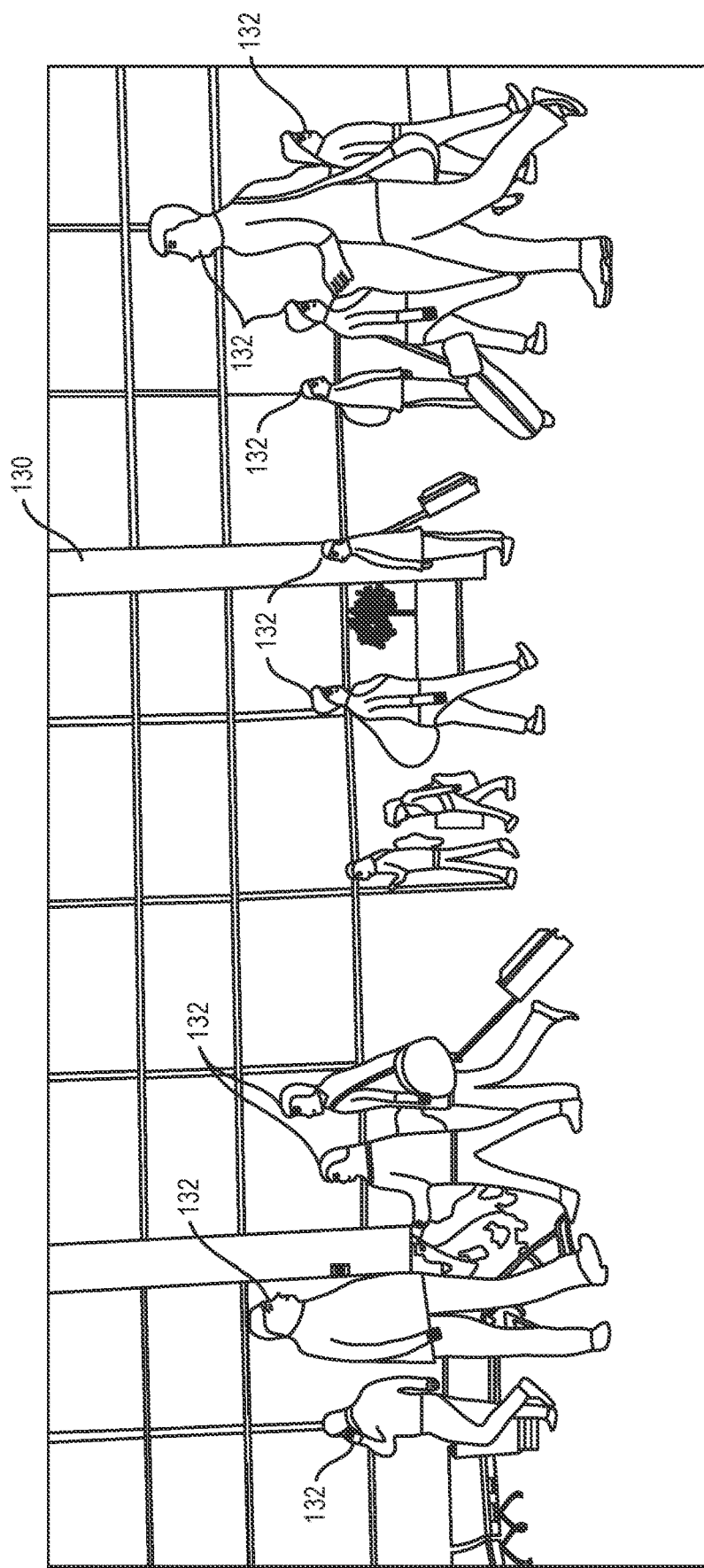
FIG. 9 is a schematic diagram of an IoT thermal imaging camera imaging a field of view in which several persons are gathered.

FIG. 9 is a schematic diagram of IoT thermal imaging camera 130 imaging a field of view in which several persons 132 are gathered. Thermal imaging camera 130 can be used in one of a plurality of different use cases, a few of which will be described here. For example, in a first use case, thermal imaging camera 130 can be used to scan the skin temperatures of persons 132 so as to ascertain whether any of persons 132 are running a fever. In a second use case, thermal imaging camera 130 can identify the density of persons in various locations so as to ascertain whether social distancing between persons is being practiced. In a third use case, thermal imaging camera can be used to count the number of persons within a designated sub-field of view within the field of view. In a fourth use case, thermal imaging camera can be used to identify if any person is in the field of view, for security purposes, for example. For each of these use cases, thermal imaging camera 130: i) can be configured differently; ii) can provide different data; iii) can transform the data differently; iv) can generate different rules for alerts; v) can interface with processor 12 differently; vi) can communicate with a user via a differently configured UI dashboard 14, etc. In some embodiments, the deployment configuration template can facilitate all these differences.

A specific deployment configuration template corresponding to each of the use cases of IoT device 12 can be used to configure IoT device 12 upon deployment for the intended use case. In some embodiments, IoT device 12 has templates for each possible use case. In other embodiments, IoT device 12 is configured specifically for one specific purpose only. The deployment configuration template corresponding to the use case can then be selected by a user or determined by IoT system requirements, for example. In still other embodiments, the deployment configuration template defines general deployment configuration of a specific IoT device. Such general deployment configuration can be used for the IoT device regardless of its intended use condition. In such an embodiment, the IoT device can be further configured after deployment based on its use condition.

Figure 10:
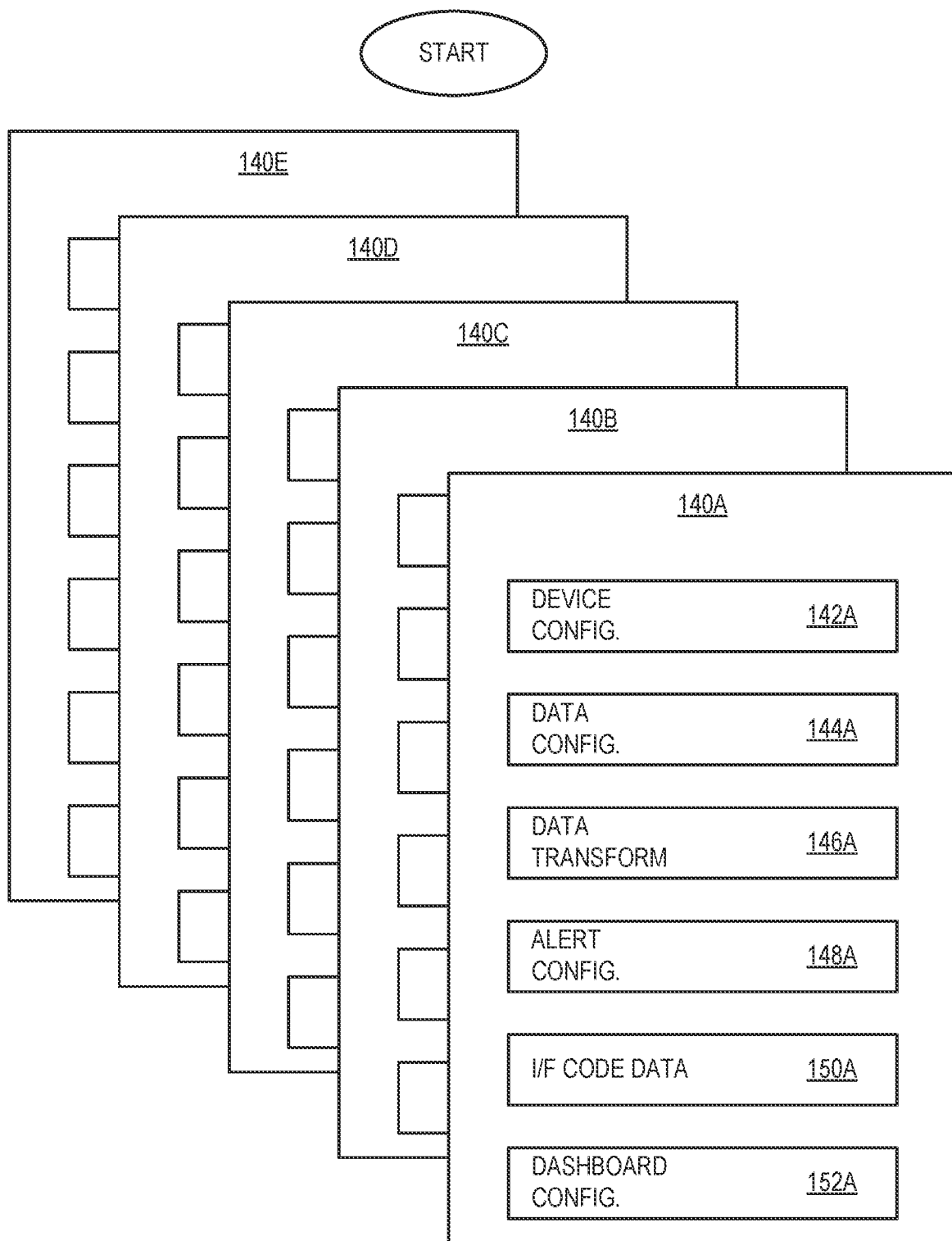
FIG. 10 is a schematic diagram of a plurality of deployment configuration templates used by a processor for configuring an interface for the IoT device.

FIG. 10 is a schematic diagram of a plurality of deployment configuration data templates used by a processor for configuring an interface for the IoT device. In FIG. 10, deployment configuration data templates 140A-140E each contain code and/or data for use in interfacing between a processor, such as, for example, processor 16 and IoT device 12. Each of deployment configuration templates 140A-140E corresponds to a particular one of a plurality of deployment configurations corresponding to IoT device 12. For example, deployment configuration template 140A can correspond to a first of the plurality of deployment configurations of IoT device 12, such as, for example, the first deployment configuration described above with reference to thermal imaging camera 130, and deployment configuration 140E can correspond to a last or fifth of the plurality of deployment configurations of IoT device 12 the fifth deployment configuration described above with reference to thermal imaging camera 130. Deployment configuration templates 140A-140E can include code and/or data for configuring IoT device 12. Deployment configuration templates 140A-140E can include code and/or data to facilitate processor 16 to interface with IoT device 12, so configured. Deployment configuration templates 140A-140E can include data transformations corresponding to rules and alerts, data transformations, etc. related to the above disclosed apparatus and methods.

Deployment configuration template 140A includes IoT configuration data and/or code 142A, data stream configuration data and/or code 144A, data transformation(s) code and/or definition 146A, rule(s) for generating an alert(s) code and/or definition 148A, processor interface code and/or data 150A, and UI dashboard configuration data and/or code 152A. Each of these elements of deployment configuration template 140A can be employed for its respective function so as to dynamically configure IoT device 12, to which it pertains, such as thermal imaging camera 130, for example. A specific one of deployment configuration templates 140A-140E can be selected by processor 16. Processor 16 can then dynamically perform the configurations and/or operations as provided by the data and/or code in the deployment configuration template.

Figure 11:
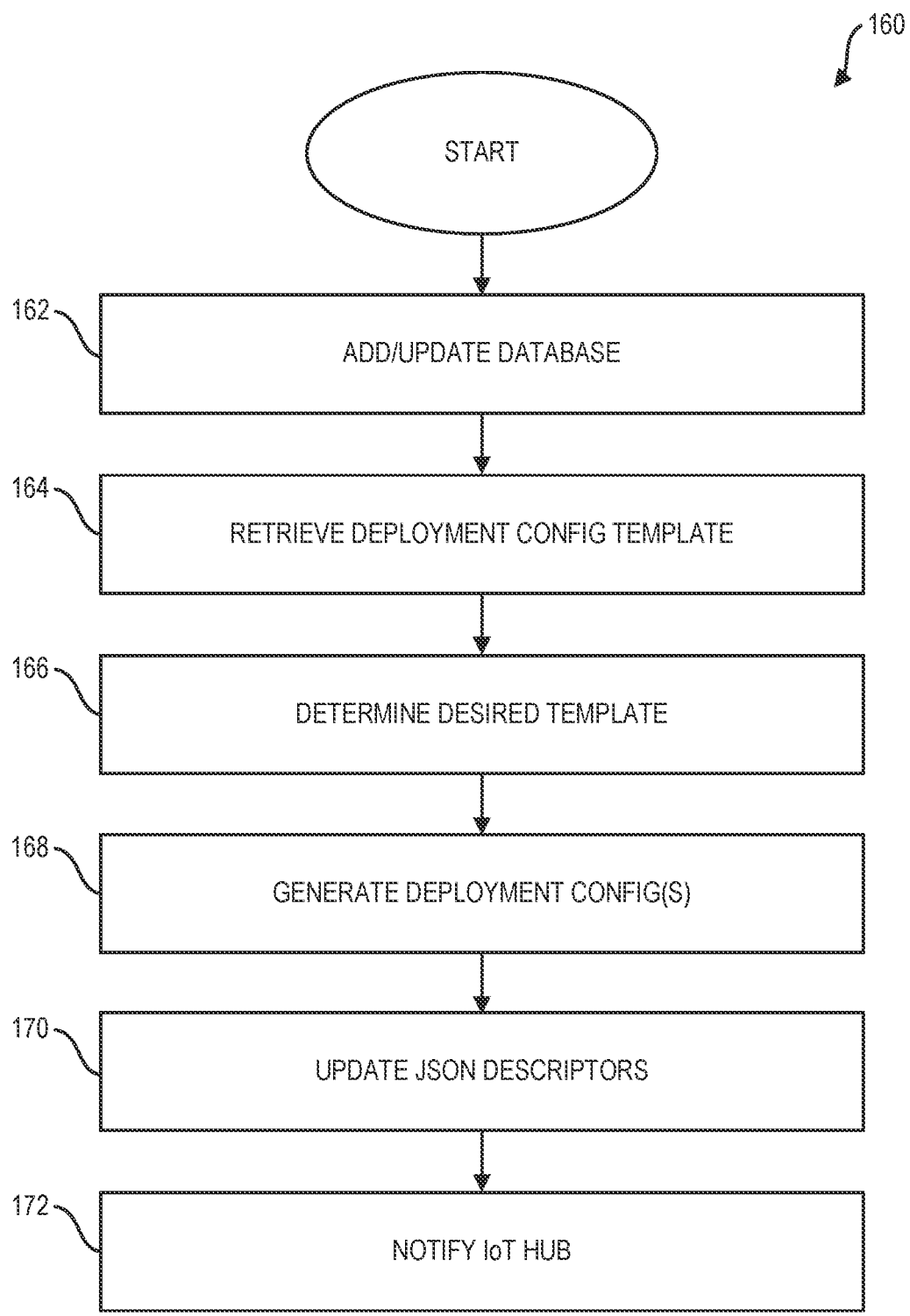
FIG. 11 is a flow chart of a method for deploying, based on a use case captured, software to interface with an IoT device.

FIG. 11 is a flow chart of a method for deploying, based on a deployment configuration captured, software to interface with IoT device 12. In FIG. 11, method 160 can be performed, at least in part, by processor 16 of the above-described IoT device interface system 36.

Method 160 begins at step 162, where processor 16 adds or updates a database to reflect the addition of IoT device 12 to an IoT system. In some embodiments processor 16 detects that IoT device 12 has been added to an IoT system. In other embodiments, a user provides input to processor 16 identifying the addition of IoT device 12.

In some embodiments, the specific one of the plurality of selectable deployment configurations is provided by IoT device 12 via the device-data definition or in some other manner.

At step 164, processor 16 retrieves one or more of a plurality of deployment configuration templates corresponding to IoT device 12 being added to the IoT system. In some embodiments, the deployment configuration template(s) includes a standard definition of configuration of IoT device 12. Such a standard definition can include general configuration for IoT device 12, independent of use case. In other embodiments, the deployment configuration template(s) includes a definition of a configuration of the IoT device that corresponds to a specific use case(s). In some embodiments, the deployment configuration template(s) includes a definition of a software to be deployed. Such software can facilitate communications between processor 16 and IoT device 12. In some embodiments, the deployment configuration template(s) includes a json descriptor. In some embodiments, processor 16 retrieves the one or more deployment configuration templates from IoT device 12. In other embodiments, the plurality of deployment configuration templates is maintained in a library accessible to processor 16.

At step 166, processor 16 determines a desired deployment configuration for IoT device 12. Such a desired deployment configuration corresponding to one of the one or more deployment configuration templates retrieved by processor 16. The desired deployment configuration can be determined in various manners. In some embodiments, the desired deployment configuration can be determined based on a configuration represented in device twin json descriptors and/or known device data configuration(s). In other embodiments, processor 16 can determine the desired deployment configuration, based on properties of the IoT system, properties of IoT device 12, and/or properties provided by user input, such as, for example, a use case. In some embodiments, combinations of the above considerations can be used to determine the desired deployment configuration.

At step 168, processor 16 generates the required deployment configurations based on the one or more of the plurality of deployment configuration templates retrieved. The generated deployment configuration(s) is compared against any existing deployment configuration(s) to determine if there are differences. A difference between the generated deployment configuration(s) and any existing deployment configuration(s) of the same name or identifier, which are slated be replaced by the newer generated version.

At step 170, processor 16 updates the twin json descriptors to reflect the new arrangement of required deployment configurations.

At step 172, processor 16 notifies the IoT Hub (e.g., processor that interfaces with IoT device 12) of the new deployment configuration arrangement for use by IoT device 12. The software deployed is determined based on the deployment configurations present and marked to be received in IoT device 12's twin json descriptor. In some embodiments, deployed software for use by processor 16 to interface with IoT device 12 can include identifying a plurality of software modules for use by processor 16 to interface with IoT device 12. In some embodiments, deploying software for use by processor 16 to interface with IoT device 12 can further include linking the plurality of software modules so as to interface with IoT device 12.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for dynamically generating a User Interface (UI) dashboard for interfacing with an Internet of Things (IoT) device, the method comprising:
    receiving, by a processor during initial deployment of the IoT device, a device-data definition from the IoT device, the IoT device having been preconfigured for a specific use case of a plurality of use cases for which the IoT device can be preconfigured, the device data definition indicating the specific use case and a definition of data that the IoT device can provide to the processor;
    capturing, by the processor during initial deployment of the IoT device, the specific use case indicated in the device-data definition received;
    configuring, by the processor, a User Interface (UI) dashboard based on the specific use case captured by the processor during the initial deployment of the IoT device, the UI dashboard configured so as to display a data stream provided by the IoT device in a format appropriate for the specific use case captured, wherein different formats corresponding to different use cases display the data stream using different ranges for the data stream and/or using different ones of: charts, tables, graphs or single-value displays for the data stream;
    receiving, by the processor, the data stream provided by the IoT device via the internet, the data stream conforming to the device-data definition;
    rendering, by the processor, the data stream received in the UI dashboard as configured; and
    sending, by the processor, the UI dashboard with the data stream rendered therein to a display device for display.

2. The method of claim 1, further comprising:
    requesting, by the processor, the data stream to be provided by the IoT device.

3. The method of claim 1, wherein UI dashboard is configured in a different manner than a UI dashboard configured based on an unselected one of the plurality of selectable use cases.

4. The method of claim 1, wherein the data definition defines data emitted by a device, including data type(s), data sampling rate(s), data unit(s), data filter(s), and/or predefined data conversion(s).

5. The method of claim 1, wherein the data definition defines a default UI dashboard.

6. The method of claim 1, wherein the UI dashboard includes a plurality of visual building blocks for visualization of the data stream and/or for receiving user input(s).

7. The method of claim 6, wherein the UI dashboard includes at least one of the plurality of visual building blocks selected from the group consisting of charts, graphs, and single value entries.

8. The method of claim 7, wherein the single value entries can be a status icons and/or latest data obtained by the IoT device.

9. The method of claim 1, wherein the IoT device is a first IoT device, the method further comprising:
    linking, by the processor, a second IoT device to the first IoT device so as to form an IoT system.

10. The method of claim 9, further comprising:
    reconfiguring, by the processor, the UI dashboard in response to addition of the second IoT device to the system.

11. The method of claim 9, further comprising:
    configuring, by the processor, a User Interface (UI) dashboard based, at least in part, on the data stream.

12. A system for dynamically generating a User Interface (UI) dashboard for interfacing with an Internet of Things (IoT) device, the system comprising:
    a processor in communication with the IoT device via an internet; and
    computer readable memory containing instructions that, when executed by the processor, cause the system to:
        receive, during initial deployment of the IoT device, a device-data definition from the IoT device, the IoT device having been preconfigured for a specific use case of a plurality of use cases for which the IoT device can be preconfigured, the device data definition indicating the specific use case and a definition of data that the IoT device can provide to the processor;
        capture, during initial deployment of the IoT device, the specific use case indicated in the device-data definition received;
        configure a User Interface (UI) dashboard based on the specific use case captured by the processor during the initial deployment of the IoT device, the UI dashboard configured so as to display a data stream provided by the IoT device in a manner appropriate for the specific use case captured, wherein different formats corresponding to different use cases display the data stream using different ranges for the data stream and/or using different ones of: charts, tables, graphs or single-value displays for the data stream;
        receive the data stream provided by the IoT device via the internet, the data stream conforming to the device-data definition;
        render the data stream received in the UI dashboard as configured; and send the UI dashboard with the data stream rendered therein to a display device for display.

13. The UI dashboard configuration system of claim 12, wherein the computer readable memory contains further instructions that, when executed by the processor, cause the system to:

request the data stream to be provided by the IoT device.

14. The UI dashboard configuration system of claim 12, wherein UI dashboard is configured in a different manner than a UI dashboard configured based on an unselected one of the plurality of selectable use cases.

15. The UI dashboard configuration system of claim 12, wherein the data definition defines data emitted by a device, including data type(s), data sampling rate(s), data unit(s), data filter(s), and/or predefined data conversion(s).

16. The UI dashboard configuration system of claim 12, wherein the data definition defines a default UI dashboard.

17. The UI dashboard configuration system of claim 12, wherein the UI dashboard includes a plurality of visual building blocks for visualization of the data stream and/or for receiving user input(s).

18. The UI dashboard configuration system of claim 17, wherein the UI dashboard includes at least one of the plurality of visual building blocks selected from the group consisting of charts, graphs, and single value entries.

19. The UI dashboard configuration system of claim 18, wherein the single value entries can be a status icons and/or latest data obtained by the IoT device.

20. The UI dashboard configuration system of claim 12, wherein the IoT device is a first IoT device, the wherein the computer readable memory contains further instructions that, when executed by the processor, cause the system to:

link a second IoT device to the first IoT device so as to form an IoT system.

21. The UI dashboard configuration system of claim 20, wherein the computer readable memory contains further instructions that, when executed by the processor, cause the system to:

reconfigure the UI dashboard in response to addition of the second IoT device to the system.

22. The UI dashboard configuration system of claim 12, wherein the processor is a processor of a computer hosting the UI dashboard interface.

23. The UI dashboard configuration system of claim 12, wherein the processor is a processor of a cloud-based resource.

* * * * *